United States Patent
Yang et al.

(10) Patent No.: US 12,133,209 B2
(45) Date of Patent: Oct. 29, 2024

(54) METHOD FOR SENDING MAC CONTROL ELEMENT, DEVICE AND MEDIUM

(71) Applicant: VIVO MOBILE COMMUNICATION CO., LTD., Guangdong (CN)

(72) Inventors: Yu Yang, Guangdong (CN); Yumin Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 353 days.

(21) Appl. No.: 17/572,272

(22) Filed: Jan. 10, 2022

(65) Prior Publication Data
US 2022/0132488 A1 Apr. 28, 2022

Related U.S. Application Data

(63) Continuation of application No. PCT/CN2020/101347, filed on Jul. 10, 2020.

(30) Foreign Application Priority Data

Jul. 11, 2019 (CN) .......................... 201910626320.0

(51) Int. Cl.
*H04W 72/044* (2023.01)
*H04W 72/56* (2023.01)

(52) U.S. Cl.
CPC ......... *H04W 72/046* (2013.01); *H04W 72/56* (2023.01)

(58) Field of Classification Search
CPC ... H04W 72/046; H04W 72/56; H04W 76/19; H04W 74/0833; H04B 7/0695; H04L 5/0053; H04L 5/0064; H04L 25/0226
See application file for complete search history.

(56) References Cited

U.S. PATENT DOCUMENTS

| | | | |
|---|---|---|---|
| 2018/0278467 A1 | 9/2018 | John Wilson et al. | |
| 2019/0053314 A1 | 2/2019 | Zhou et al. | |
| 2019/0190582 A1 | 6/2019 | Guo et al. | |
| 2019/0253986 A1* | 8/2019 | Jeon ..................... | H04L 5/0048 |
| 2020/0322031 A1 | 10/2020 | You et al. | |

FOREIGN PATENT DOCUMENTS

| | | | | |
|---|---|---|---|---|
| CA | 3060845 A1 * | 5/2020 | ........... | H04B 7/0695 |
| CN | 109076365 A | 12/2018 | | |
| CN | 109962756 A | 7/2019 | | |

OTHER PUBLICATIONS

Further discussion on Multi-Beam Operation, 3GPP TSG RAN WG1 #97, May 13-17, 2019, R1-1906160, vivo, Reno, USA.
UL resource allocation and usage for beam failure recovery, 3GPP TSG RAN WG2#100, Nov. 27-Dec. 1, 2017, OPPO, Reno, USA.
Further discussion on Multi-Beam Operation, 3GPP TSG RAN WG1 #96bis, Apr. 8-12, 2019, R1-1904097, vivo, Xi'an, China.
Enhancements on multi-beam operation, 3GPP TSG RAN WG1 #97, May 13-17, 2019, R1-1906851, Sony, Reno, USA.
(Continued)

*Primary Examiner* — Thai Nguyen
(74) *Attorney, Agent, or Firm* — IP & T GROUP LLP

(57) ABSTRACT

A method for sending a media access control control element includes: triggering, by a UE, generation of a MAC CE used for a BFRQ; determining a latest available uplink resource for new transmission; and sending, on the uplink resource, a generated MAC CE used for the BFRQ.

20 Claims, 2 Drawing Sheets

(56) References Cited

OTHER PUBLICATIONS

Enhancements on multi-beam operations, 3GPP TSG RAN WG1 #97, May 13-17, 2019, R1-1906537, MediaTek Inc., Reno, USA.
Discussion on Enhancements on Multi-Beam Operation, 3GPP TSG RAN WG1 Meeting #95, Nov. 12-16, 2018, R1-1812324, vivo, Spokane, USA.
First Office Action of Priority Application No. CN 201910626320.0 issued by the Chinese Patent Office on Jun. 16, 2021.
The Second Office Action of Priority Application No. CN 201910626320.0 issued by the Chinese Patent Office on Sep. 24, 2021.
International Search Report and Written Opinion of International Application No. PCT/CN2020/101347 issued by the Chinese Patent Office on Oct. 9, 2020.

* cited by examiner

METHOD FOR SENDING MAC CONTROL ELEMENT, DEVICE AND MEDIUM

CROSS-REFERENCE TO RELATED APPLICATIONS

This application is a Bypass Continuation Application of PCT/CN2020/101347 filed on Jul. 10, 2020, which claims priority to Chinese Patent Application No. 201910626320.0 filed on Jul. 11, 2019, which are incorporated herein by reference in their entirety.

TECHNICAL FIELD

The present disclosure relates to the field of wireless communications technologies, and in particular, to a method for sending a media access control (MAC) control element (CE), a device and a medium.

BACKGROUND

In a high-frequency band communications system, because a wavelength of a wireless signal is relatively short, a case that the signal is blocked or the like tends to occur during propagation, and consequently signal propagation is interrupted. If radio link reconstruction in the related art is used, it takes a long time, and thus a beam failure recovery (BFR) mechanism is introduced.

SUMMARY

Some embodiments of the present disclosure provide a method for sending a MAC CE, including:
triggering, by a user equipment (UE), generation of a MAC CE used for a beam failure recovery request (BFRQ);
determining a latest available uplink resource for new transmission; and sending, on the uplink resource, a generated MAC CE used for the BFRQ.

During implementation, the latest available uplink resource is an uplink resource closest to a time for triggering generation of the MAC CE used for the BFRQ, and the UE can complete generation of the MAC CE used for the BFRQ before sending, by using the uplink resource, the MAC CE used for the BFRQ.

During implementation, generation of the MAC CE used for the BFRQ is triggered under any one of following conditions:
the UE determines that a beam failure event occurs in at least one cell; or
the UE determines that a beam failure event occurs in at least one bandwidth part (BWP); or
the UE determines that a beam failure event occurs at at least one transmission and reception point (TRP); or
the UE determines that a beam failure event occurs in at least one cell and a new beam is identified; or
the UE determines that a beam failure event occurs in at least one BWP and a new beam is identified; or
the UE determines that a beam failure event occurs at at least one TRP and a new beam is identified.

During implementation, the uplink resource is an uplink resource used to send uplink information other than the MAC CE used for the BFRQ.

During implementation, the uplink resource used to send uplink information other than the MAC CE used for the BFRQ is an uplink resource determined in one or a combination of following manners:
an uplink resource indicated by a configured grant configured grant;
an uplink resource used in a random access procedure; and
an uplink resource indicated by an uplink grant (UL) grant that is indicated by downlink control information (DCI).

During implementation, before the sending, on the uplink resource, a generated MAC CE used for the BFRQ, the method further includes:
triggering, under any one of following condition, the UE to send a scheduling request (SR) to a network side device:
generation of the MAC CE used for the BFRQ has been triggered; or
generation of the MAC CE used for the BFRQ has been completed; or
the UE determines that a beam failure event occurs in at least one cell; or
the UE determines that a beam failure event occurs in at least one BWP; or
the UE determines that a beam failure event occurs at at least one TRP; or
the UE determines that a beam failure event occurs in at least one cell and a new beam is identified; or
the UE determines that a beam failure event occurs in at least one BWP and a new beam is identified; or
the UE determines that a beam failure event occurs at at least one TRP and a new beam is identified.

During implementation, the TRP is represented by one or a combination of following:
a control resource set or a control resource set group;
an explicitly defined TRP;
a transmission configuration indication state, a transmission configuration indication state list, or a transmission configuration indication state pool;
quasi co-location (QCL) information or QCL group information;
spatial relationship information or spatial relationship group information;
a physical downlink control channel (PDCCH) scrambling identifier or a PDCCH scrambling identifier group;
a physical downlink shared channel (PDSCH) scrambling identifier or a PDSCH scrambling identifier group;
a PDCCH configuration information element;
a PDSCH configuration information element; and
a reference signal resource or a reference signal resource set.

During implementation, in a case of determining the latest available uplink resource for new transmission, if there are a plurality of available uplink resources, at least one uplink resource with a high priority is determined based on a preset priority relationship and used to send the MAC CE used for the BFRQ.

During implementation, the preset priority relationship includes one or a combination of following relationships:
a priority of an uplink resource, indicated by a UL grant, of a primary cell (PCell) or a primary secondary cell (PSCell) is higher than that of an uplink resource, indicated by the UL grant, of a secondary cell (SCell);
a priority of an uplink resource, indicated by a UL grant, of a SCell in which no beam failure event occurs is higher than that of an uplink resource, indicated by the UL grant, of a SCell in which a beam failure event has occurred;

a preset priority order for any two or a combination of following uplink resources: an uplink resource configured or indicated by a network and used to send the MAC CE used for the BFRQ, an uplink resource indicated by a configured grant and used to send uplink information other than the MAC CE used for the BFRQ, an uplink resource used in a random access procedure and used to send uplink information other than the MAC CE used for the BFRQ, and an uplink resource indicated by a dynamic grant and used to send uplink information other than the MAC CE used for the BFRQ;

an uplink resource with a larger payload size in uplink resources indicated by a UL grant has a higher priority;

an uplink resource with a lower latency in uplink resources indicated by a UL grant has a higher priority; and an uplink resource with higher reliability in uplink resources indicated by a UL grant has a higher priority.

Some embodiments of the present disclosure provide an apparatus for sending a MAC CE, including:

a triggering generation module, configured to trigger generation of a MAC CE used for a BFRQ;

an uplink resource determining module, configured to determine a latest available uplink resource for new transmission; and a sending module, configured to send, on the uplink resource, a generated MAC CE used for the BFRQ.

Some embodiments of the present disclosure provides a terminal, including a memory, a processor, and a computer program stored in the memory and executable on the processor, where the processor implements the method for sending a MAC CE when executing the computer program.

Some embodiments of the present disclosure provides a non-transitory computer-readable storage medium, where the non-transitory computer-readable storage medium stores a computer program for performing the method for sending a MAC CE.

BRIEF DESCRIPTION OF DRAWINGS

The accompanying drawings described herein are used to provide a further understanding of the present disclosure and constitute a part of the present disclosure. The illustrative embodiments of the present disclosure and descriptions thereof are used to explain the present disclosure, and do not constitute any improper limitation on the present disclosure. In the accompanying drawings.

DETAILED DESCRIPTION OF EMBODIMENTS

Figure 1:
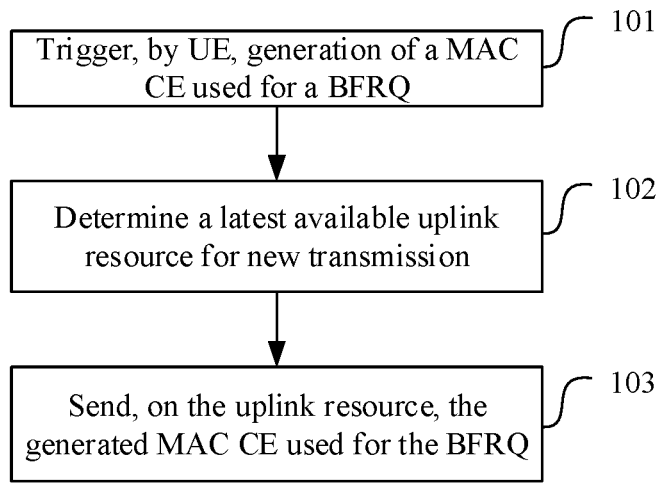
FIG. 1 is a schematic flowchart of implementing a method for sending a MAC CE according to some embodiments of the present disclosure.

BFR mechanism includes following four parts:
Beam failure detection (beam failure detection):
A UE (also named terminal) measures a beam failure detection reference signal (BFD RS) at a physical layer, and determines, based on a measurement result, whether a beam failure event occurs. A determining condition is as follows: If it is detected that metrics (for example, a hypothetical physical downlink control channel (PDCCH) block error rate (BLER) of all serving beams meet a preset condition (exceed a preset threshold), it is determined that one beam failure instance occurs. A physical layer of UE (also named physical layer of terminal) reports an indication to a higher layer (the media access control (MAC) layer) of the UE, and the reporting process is periodic. On the contrary, if the physical layer of the UE determines that no beam failure instance occurs, the UE does not send any indication to the higher layer. The higher layer of the UE counts, by using a counter, a quantity of indications reported by the physical layer. When a maximum quantity of indications configured by a network is reached, the UE declares that a beam failure event occurs.

New candidate beam identification (new candidate beam recognition):

The terminal measures a beam identification reference signal (RS) at the physical layer, and searches for a new candidate beam. This step may occur either after or before a beam failure event. When the physical layer of the UE receives a request or an indication or a notification from the higher layer (the MAC layer) of the UE, a measurement result meeting a preset condition (for example, measurement quality of the beam identification RS exceeds a threshold of a preset layer 1 reference signal received power (L1-RSRP) is reported to the higher layer of the UE, and report content is {beam RS index, L1-RSRP}. The higher layer of the UE selects a candidate beam based on the report of the physical layer.

Beam Failure Recovery Request Transmission:

The higher layer (the MAC layer) of the UE determines a physical random access channel (PRACH) resource/sequence based on the selected candidate beam. If determining that a trigger condition of a BFRQ is met, the UE sends the BFRQ to a base station on a contention-free PRACH. The terminal needs to send the BFRQ based on a quantity of times and/or a timer of sending the BFRQ configured by the network. The contention-free PRACH resource herein and other PRACH resources (for example, PRACH resources used for initial access) may be frequency division multiplexing (FDM) or code division multiplexing (CDM), where physical random access channel preambles (PRACH preambles) of the CDM need to have a same sequence design.

UE monitors next generation node base station (gNB) response for the BFRQ:

After receiving the BFRQ, the base station sends a response on a dedicated PDCCH in a control resource set used for beam failure recovery (Control Resource Set—Beam Failure Recovery, CORESET-BFR), where the response carries a cell-radio network temporary identifier (C-RNTI), and may further include a handover to a new candidate beam, a beam search restart, or another indication. If the beam failure recovery fails, the physical layer of the UE sends an indication to the higher layer of the UE, so that the higher layer determines a subsequent radio link failure process.

In other cases, the beam may also be referred to as a spatial filter, a spatial domain transmission filter, and the like, which are technical concepts of the same meaning as the beam in this application. Beam information may also be expressed as transmission configuration indication (TCI) state information, QCL information, spatial relation information, and the like.

The following briefly describes a SCell BFR mechanism.

A multi-carrier scenario may also be understood as carrier aggregation (CA), in which there are a plurality of carriers, or a plurality of component carriers (CC), or a plurality of cells. There is one primary cell (such as a primary cell (PCell) in a master cell group (MCG), or a primary secondary cell (PSCell) in a secondary cell group (SCG) and at least one Scell. A possible solution is as follows:

Scenarios:
There are downlink and uplink on the Scell.
There is only downlink on the Scell.
The PCell may be in an frequency range 1 (FR1) or FR2.
SCell BFD RS:
There is periodic 1 port channel state information reference signal (1-port CSI-RS).
A measurement results is based on a hypothetical block error rate (BLER).
For explicit configuration, the BFD RS is on a current CC.
For implicit configuration, the BFD RS may be on an active BWP on a current CC or another CC.
downlink reference signal (DL RS) for new beam:
DL RS for new beam identification may be based on a synchronization signal and PBCH block (SSB) and CSI-RS for beam management (BM).
The DL RS for new beam identification may be transmitted on the active BWP, and the BWP belongs to a CC configured to listen for BFR or another CC on the same band.
A new beam identification threshold is based on L1-RSRP.
When SCell BFR is configured and RS for new beam identification is also configured, the threshold of new beam identification is always configured.
If one SCell fails, when no L1-RSRP for a new beam is higher than the configured threshold, for new beam information reporting, the UE reports no new beam identified for the SCell.
Beam Failure Recovery Request:
Sending condition: If detecting a beam failure, the UE sends a BFRQ to the network;
for SCell with DL only, the UE report, on the physical uplink shared channel (PUSCH) or physical uplink control channel (PUCCH), the CC index(es) where the beam failure occurred and new beam information to identify the new beam. If a new candidate beam RS and a corresponding threshold are configured and at least that channel quality of the new beam is greater than or equal to the threshold, the UE reports the new beam information. The UE reports a beam index of only one beam for one SCell.
A dedicated SR on the PCell or PSCell is used to trigger the PUSCH used to transmit the BFRQ.
The disadvantage of the related art is that no solution can be used to transmit BFRQ information in a SCell BFR process.
There is no solution for transmitting a BFRQ in a SCell BFR process.
This means that which data is used to transmit the BFRQ and on which resource the request is transmitted need to be resolved.
Based on this, the technical solutions provided by some embodiments of the present disclosure describe how to report BFRQ information to a network side by using an uplink resource in the SCell BFR process.
Some embodiments of the present disclosure are described below with reference to the accompanying drawings.

During description, an implementation of the network side may be involved, but such a description manner does not mean that a UE side and the network side must be implemented in cooperation with each other or separately. In fact, when the UE side is implemented independently, problems of the UE side are also resolved.

FIG. 1 is a schematic flowchart of implementing a method for sending a MAC CE. As shown in the figure, the method may include:

Step 101: Trigger, by UE, generation of a MAC CE used for a BFRQ;
Step 102: Determine a latest available uplink resource for new transmission; and
Step 103: Send, on the uplink resource, a generated MAC CE used for the BFRQ.

Optionally, in the solution, it is determined that a MAC CE is used to carry information about the BFRQ, and the UE determines the latest available uplink resource as the uplink resource used to send the MAC CE used for the BFRQ, which may also be described as that a next available uplink resource for new transmission (next available uplink (UL) resource for new transmission) is used to transmit the MAC CE used for the BFRQ.

During implementation, the latest available uplink resource is an uplink resource closest to a time for triggering generation of the MAC CE used for the BFRQ, and the UE can complete generation of the MAC CE used for the BFRQ before sending, by using the uplink resource, the MAC CE used for the BFRQ.

During implementation, generation of the MAC CE used for the BFRQ is triggered under any one of the following conditions:
the UE determines that a beam failure event occurs in at least one cell; or
the UE determines that a beam failure event occurs in at least one BWP; or
the UE determines that a beam failure event occurs at at least one TRP; or
the UE determines that a beam failure event occurs in at least one cell and a new beam is identified; or
the UE determines that a beam failure event occurs in at least one BWP and a new beam is identified; or
the UE determines that a beam failure event occurs at at least one TRP and a new beam is identified.

During implementation, the transmission and reception point (TRP) may be represented by one or a combination of the following:
a control resource set or a control resource set group;
an explicitly defined TRP;
a transmission configuration indication state, a transmission configuration indication state list, or a transmission configuration indication state pool;
QCL information or QCL group information;
spatial relationship information or spatial relationship group information;
a PDCCH scrambling identifier or a PDCCH scrambling identifier group;
a PDSCH scrambling identifier or a PDSCH scrambling identifier group;
a PDCCH configuration information element;
a PDSCH configuration information element; and
a reference signal resource or a reference signal resource set.

During implementation, the uplink resource may be an uplink resource configured or indicated by a network and used to send the MAC CE used for the BFRQ.

Optionally, the uplink resource of the MAC CE used for the BFRQ may be configured by the network, for example, configured by the network by using radio resource control (RRC) signaling.

The uplink resource may alternatively be indicated by the network, for example, indicated by using DCI or the MAC CE.

During implementation, the uplink resource may be an uplink resource used to send uplink information other than the MAC CE used for the BFRQ.

Optionally, the uplink information other than the MAC CE used for the BFRQ herein may be information of other logical channels, including but not limited to information of various logical channels in the related art:

C-RNTI MAC CE or data from an uplink common control channel (UL-CCCH) (MAC CE used to transmit a C-RNTI or data from UL-CCCH);

configured Grant Confirmation MAC CE (a MAC CE used to transmit configured grant confirmation);

MAC CE for BSR, with exception of BSR included for padding (a MAC CE used to transmit a first buffer status report (BSR), where the first BSR does not include a BSR used for padding);

Single Entry PHR MAC CE or Multiple Entry PHR MAC CE (a MAC CE used to transmit a single entry power headroom report or a MAC CE used to transmit a multiple entry power headroom report);

data from any Logical Channel, except data from UL-CCCH (data from any logical channel, except for data from a UL-CCCH);

MAC CE for Recommended bit rate query (a MAC CE used to transmit a recommended bit rate query); and MAC CE for BSR included for padding (a MAC CE used to transmit a second BSR, where the second BSR includes a BSR used for padding).

During implementation, the uplink resource used to send the MAC CE used for the BFRQ and the uplink resource used to send uplink information other than the MAC CE used for the BFRQ may be uplink resources determined in one or a combination of the following manners:

an uplink resource indicated by a configured grant;
an uplink resource used in a random access procedure; and
an uplink resource indicated by a UL grant that is indicated by DCI.

Optionally, during implementation, the UE uses the next available uplink resource for new transmission (next available UL resource for new transmission) as the uplink resource used to send the MAC CE used for the BFRQ. The following describes available uplink resources.

1. On an uplink resource, the MAC CE used for the BFRQ can be multiplexed with another uplink information, such as another MAC CE.
2. The next available uplink resource for new transmission may also be determined in at least one of the following manners:
1) For uplink resources indicated by a configured grant, also be referred to as grant free, or uplink resources used in a random access (RA) procedure, descriptions are as follows:

A latest unused uplink resource in the uplink resources indicated by the configured grant and/or used in the random access procedure may be used as the uplink resource used to send the MAC CE used for the BFRQ.

The uplink resource used in the random access procedure may be an uplink resource in a 2-step random access procedure, or may be an uplink resource in a 4-step random access procedure. The uplink resource herein includes a PUSCH.

2) For uplink resources indicated by a dynamic grant, descriptions are as follows:

For example, an uplink resource indicated by a UL grant that is indicated by downlink control information (DCI) may be used as the uplink resource used to send the MAC CE used for the BFRQ.

3) For an uplink resource triggered by sending a dedicated scheduling request (SR) by using the UE, descriptions are as follows:

(1) A trigger condition under which the UE sends the dedicated SR may be as follows, that is, during implementation, before the sending, on the uplink resource, the generated MAC CE used for the BFRQ, the method further includes:

triggering, under any one of the following condition, the UE to send an SR to a network side device:

generation of the MAC CE used for the BFRQ has been triggered; or generation of the MAC CE used for the BFRQ has been completed; or the UE determines that a beam failure event occurs in at least one cell; or the UE determines that a beam failure event occurs in at least one BWP; or the UE determines that a beam failure event occurs at at least one TRP; or the UE determines that a beam failure event occurs in at least one cell and a new beam is identified; or the UE determines that a beam failure event occurs in at least one BWP and a new beam is identified; or the UE determines that a beam failure event occurs at at least one TRP and a new beam is identified.

During implementation, the TRP is represented by one or a combination of the following information:

a control resource set or a control resource set group;
an explicitly defined TRP;
a transmission configuration indication state, a transmission configuration indication state list, or a transmission configuration indication state pool;
QCL information or QCL group information;
spatial relationship information or spatial relationship group information;
a PDCCH scrambling identifier or a PDCCH scrambling identifier group;
a PDSCH scrambling identifier or a PDSCH scrambling identifier group;
a PDCCH configuration information element;
a PDSCH configuration information element; and
a reference signal resource or a reference signal resource set.

(2) After sending the dedicated SR, the UE receives DCI sent by the network side device, and an uplink resource indicated by a UL grant that is indicated by the DCI can be used as the uplink resource used to send the MAC CE used for the BFRQ.

During implementation, in a case of determining the latest available uplink resource for new transmission, if there are a plurality of available uplink resources, at least one uplink resource with a high priority is determined based on a preset priority relationship and used to send the MAC CE used for the BFRQ.

During specific implementation, the preset priority relationship may include one or a combination of the following relationships:

a priority of an uplink resource, indicated by a UL grant, of a PCell or a PSCell is higher than that of an uplink resource, indicated by the UL grant, of a SCell;

a priority of an uplink resource, indicated by a UL grant, of a SCell in which no beam failure event occurs is higher than that of an uplink resource, indicated by the UL grant, of a SCell in which a beam failure event has occurred;

a preset priority order for any two or a combination of the following uplink resources: an uplink resource configured or indicated by a network and used to send the MAC CE used for the BFRQ, an uplink resource indicated by a configured grant and used to send uplink information other than the MAC CE used for the BFRQ, an uplink resource used in a random access procedure and used to send uplink information other than the MAC CE used for the BFRQ, and an uplink resource indicated by a dynamic grant and used to send uplink information other than the MAC CE used for the BFRQ;

an uplink resource with a larger payload size in uplink resources indicated by a UL grant has a higher priority;

an uplink resource with a lower latency in uplink resources indicated by a UL grant has a higher priority; and an uplink resource with higher reliability in uplink resources indicated by a UL grant has a higher priority.

Optionally, when there are a plurality of selected uplink resources, at least one of the uplink resources may be determined, based on a preset priority relationship, as the uplink resource used to send the MAC CE used for the BFRQ.

The preset priority relationship may include one or a combination of the following relationships:

1. Priorities in descending order are as follows: an uplink resource, indicated by a UL grant, of a PCell or a PSCell>an uplink resource, indicated by a UL grant, of a SCell.

2. Priorities in descending order are as follows: an uplink resource, indicated by a UL grant, of a SCell in which no beam failure event occurs>an uplink resource, indicated by the UL grant, of a SCell in which a beam failure event has occurred.

3. Various uplink resources include but are not limited to: (a) an uplink resource indicated by a UL grant triggered by a dedicated SR, (b) an uplink resource indicated by a configured grant, (c) an uplink resource used in a random access procedure, and (d) an uplink resource indicated by a dynamic grant.

For the foregoing uplink resources, there may be any preset priority order, such as a>d>b>c, a>b>c>d, b>c>a>d, b>c>d>a, d>a>b>c, and d>b>c>a. In the foregoing priority orders of the uplink resources, priorities of different uplink resources may be different, that is, one uplink resource has a higher priority, or priorities of different uplink resources may be equal, such as b=c.

Certainly, any two or three of the uplink resources may be selected to preset priority orders, such as a>d, a >b>d, b >c>d, d>a, a>b, and c>a. Similarly, in the foregoing priority orders of the uplink resources, priorities of different uplink resources may be different, that is, one uplink resource has a higher priority, or priorities of different uplink resources may be equal, such as a=c.

During implementation, a priority of the uplink resource configured or indicated by a network and used to send the MAC CE used for the BFRQ may be set to be higher than the three uplink resources used to send uplink information other than the MAC CE used for the BFRQ.

4. An uplink resource with a larger payload size in uplink resources indicated by a UL grant is selected.

5. An uplink resource with a lower latency in uplink resources indicated by the UL grant is selected.

6. An uplink resource with higher reliability in uplink resources indicated by a UL grant is selected.

Optionally, the uplink grant has high reliability, such as general reliability, and high reliability; or the lower the modulation and coding scheme (MCS) level, the higher the priority.

In view of an implementation on a network side, some of the foregoing technical solutions are selected to be described in detail below as a whole, to better understand the technical solutions provided in some embodiments of the present disclosure.

In this example, UE determines a latest available uplink resource as an uplink resource used to send a MAC CE used for a BFRQ. In addition, when there are a plurality of uplink resources, the uplink resource is determined based on a preset priority relationship.

Step 1: The UE measures a BFD RS, and determines, based on a measurement result, whether a beam failure event occurs in at least one cell.

Step 2: The UE measures a DL RS for new beam identification, and determines whether a new beam is found.

Step 3: The UE triggers generation of a MAC CE used for a BFRQ.

A trigger condition for generation of the MAC CE used for the BFRQ may be one of the following:

(1) In step 1, the UE determines that a beam failure event has occurred in at least one cell.

(2) In step 1, the UE determines that a beam failure event has occurred in at least one cell, and the UE finds a new beam in step 2.

Step 4: The UE uses a next available uplink resource for new transmission as the uplink resource used to send the MAC CE used for the BFRQ.

A. On an uplink resource, the MAC CE used for the BFRQ can be multiplexed with another uplink information, such as another MAC CE.

B. The next available uplink resource for new transmission may also be determined in at least one of the following manners:

1) For uplink resources indicated by a configured grant (or grant free), or uplink resources used in a random access procedure, descriptions are as follows:

A latest unused uplink resource in the uplink resources indicated by the configured grant and/or used in the random access procedure is used as the uplink resource used to send the MAC CE used for the BFRQ.

2) For uplink resources indicated by a dynamic grant, descriptions are as follows:

An uplink resource indicated by a UL grant that is indicated by the latest DCI is used as the uplink resource used to send the MAC CE used for the BFRQ.

3) For an uplink resource triggered by sending a dedicated SR by using the UE, descriptions are as follows:

(1) A trigger condition under which the UE sends the dedicated SR may be one of the following:

when the UE determines that a beam failure event has occurred in at least one cell; and when the UE determines that a beam failure event has occurred in at least one cell, and the UE finds a new beam.

(2) After sending the dedicated SR, the UE receives DCI sent by a network, and an uplink resource indicated by a UL grant that is indicated by the DCI is used as the uplink resource used to send the MAC CE used for the BFRQ.

Step 5: When there are a plurality of selected uplink resources in step 4, at least one of the uplink resources is determined, based on a preset priority relationship, as the uplink resource used to send the MAC CE used for the BFRQ.

The preset priority relationship may include at least one the following:
(1) Priorities in descending order are as follows: an uplink resource, indicated by a UL grant, of a PCell or a PSCell>an uplink resource, indicated by a UL grant, of a SCell.
(2) Priorities in descending order are as follows: an uplink resource, indicated by a UL grant, of a SCell in which no beam failure event occurs>an uplink resource, indicated by the UL grant, of a SCell in which a beam failure event has occurred.
(3) Various uplink resources include but are not limited the following uplink resources:
a) an uplink resource indicated by a UL grant triggered by a dedicated SR, b) an uplink resource indicated by a configured grant, c) an uplink resource used in a random access procedure, and d) an uplink resource indicated by a dynamic grant.

For the foregoing uplink resources, there may be any preset priority order, such as a>d>b=c, a>b=c>d, b=c>a>d, b=c>d>a, d>a>b=c, and d>b=c>a, and b and c may alternatively be preset with different priorities, that is, one of them has a higher priority.
(4) An uplink resource with a larger payload size in uplink resources indicated by a UL grant is selected.
(5) An uplink resource with a lower latency in uplink resources indicated by the UL grant is selected.

Step 6: The UE uses the selected uplink resource to send, to the network, the MAC CE used for the BFRQ.

The following describes the solutions by using embodiments, to better understand the technical solutions provided in some embodiments of the present disclosure.

The embodiments provide illustration for determining an uplink resource with reference to the drawings.

Embodiment 1

Figure 2:
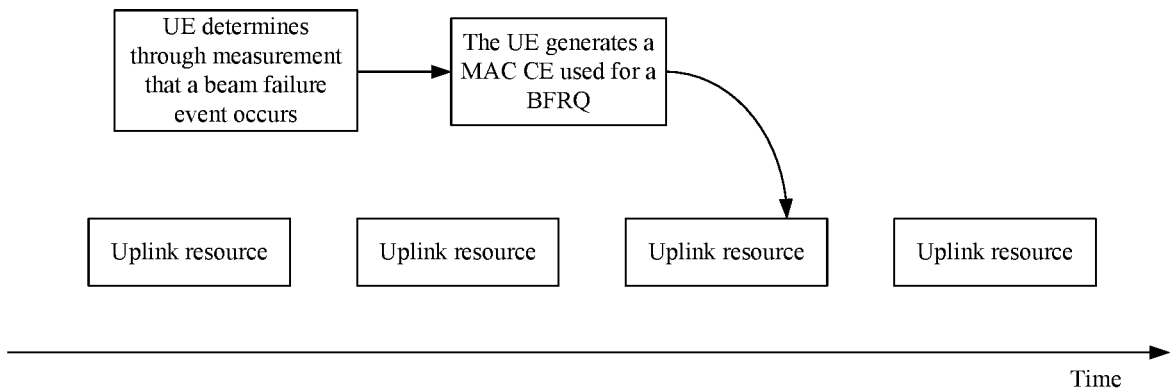
FIG. 2 is a schematic diagram of selecting an uplink resource in some embodiments 1 of the present disclosure.

FIG. 2 is a schematic diagram of selecting an uplink resource in Embodiment 1. As shown in the figure, for uplink resources indicated by a configured grant or uplink resources used in a random access procedure, a latest unused uplink resource is used as an uplink resource used to send a MAC CE used for a BFRQ.

Embodiment 2

Figure 3:
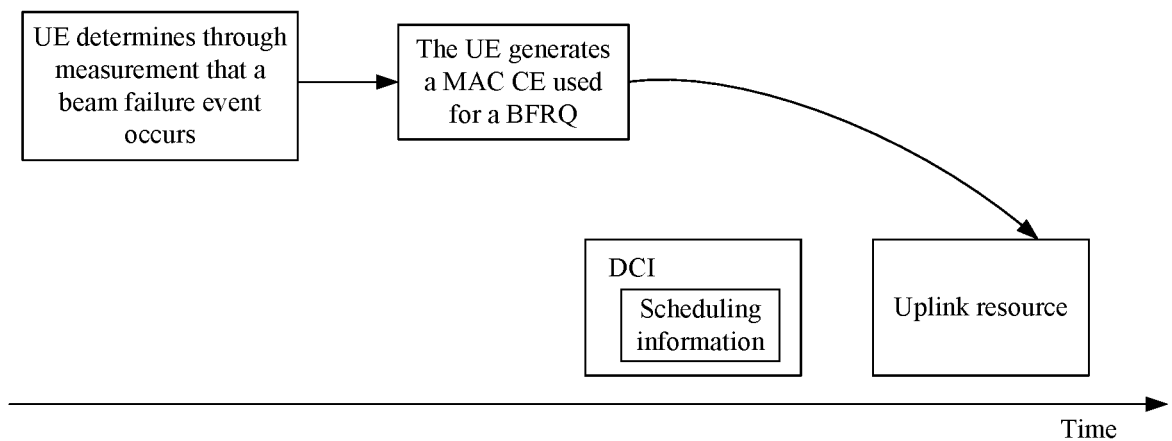
FIG. 3 is a schematic diagram of selecting an uplink resource in some embodiments 2 of the present disclosure.

FIG. 3 is a schematic diagram of selecting an uplink resource in Embodiment 2. As shown in the figure, for uplink resources indicated by a dynamic grant, an uplink resource indicated by a UL grant that is indicated by the latest DCI is used as an uplink resource used to send a MAC CE used for a BFRQ.

Based on a same inventive concept, some embodiments of the present disclosure further provides an apparatus for sending a MAC CE, a computer device, and a non-transitory computer-readable storage medium. Because a problem-resolving principle of these devices is similar to that of the method for sending a MAC CE, for implementation of these devices, reference may be made to implementation of the method, and repeated parts are not described.

Figure 4:
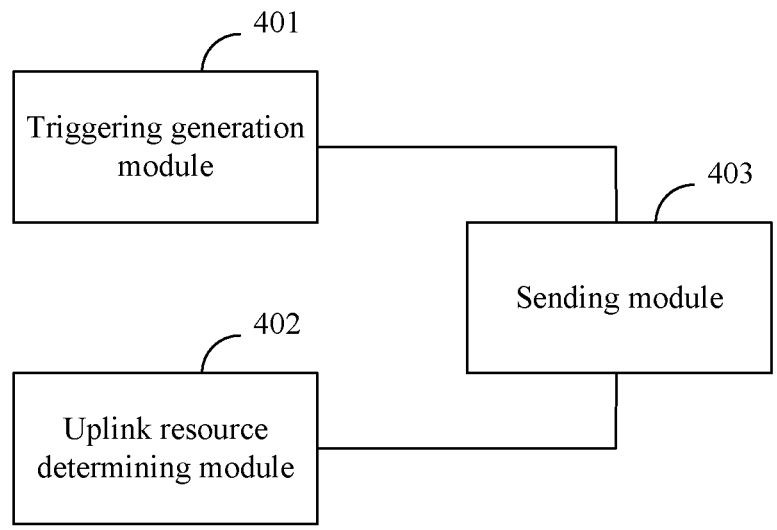
FIG. 4 is a schematic structural diagram of an apparatus for sending a MAC CE according to some embodiments of the present disclosure.

FIG. 4 is a schematic structural diagram of an apparatus for sending a MAC CE. As shown in the figure, the apparatus may include:
a triggering generation module 401, configured to trigger generation of a MAC CE used for a BFRQ;
an uplink resource determining module 402, configured to determine a latest available uplink resource for new transmission; and
a sending module 403, configured to send, on the uplink resource, the generated MAC CE used for the BFRQ.

For ease of description, the foregoing apparatus is divided into various modules or units based on functions for separate description. Certainly, functions of the various modules or units may be implemented in one or more pieces of software and/or hardware during implementation of the present disclosure.

Some embodiments of the present disclosure further provide a terminal.

Figure 5:
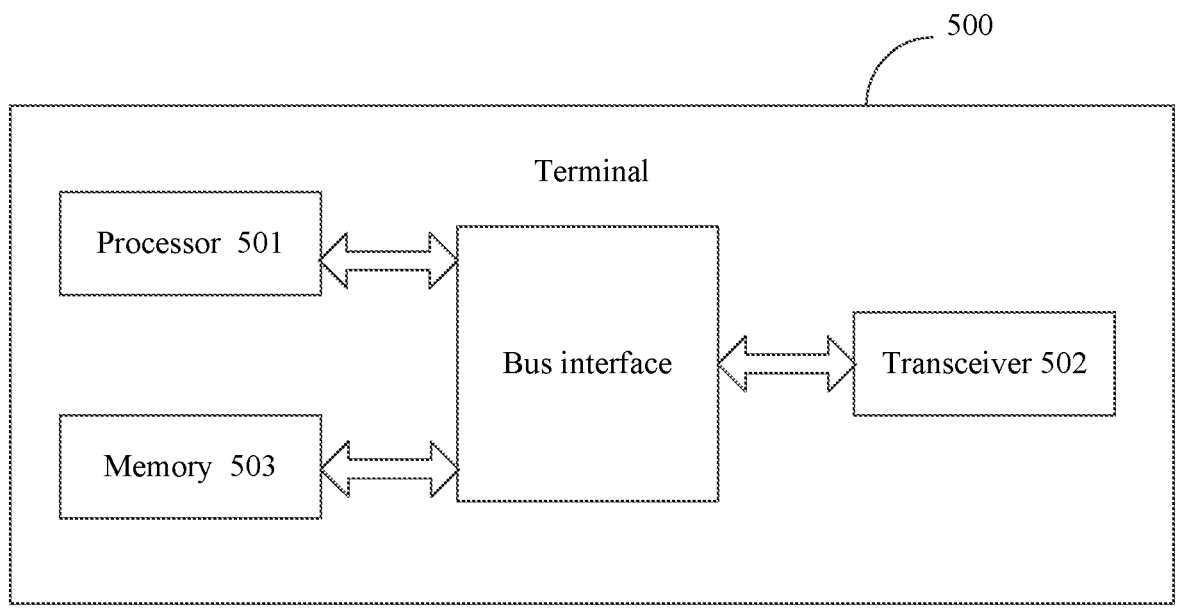
FIG. 5 is a schematic structural diagram of a terminal according to some embodiments of the present disclosure.

FIG. 5 is a schematic structural diagram of the terminal. As shown in FIG. 5, the terminal 500 includes: a processor 501, a transceiver 502, a memory 503, and a bus interface, where the processor 501 may be responsible for bus architecture management and general processing. The memory 503 may store data used by the processor 501 when the processor 501 performs an operation.

In one embodiment of the present disclosure, the terminal 500 further includes: a computer program stored in the memory 503 and executable on the processor 501. The computer program implements steps of the method for sending a MAC CE when executed by the processor 501.

In FIG. 5, a bus architecture may include any quantity of interconnected buses and bridges, which are specifically linked together by various circuits of one or more processors represented by the processor 501 and a memory represented by the memory 503. The bus architecture may further connect various other circuits such as peripheral devices, voltage regulators, and power management circuits, which are all known in the art, and therefore, no further description is given herein. The bus interface provides an interface. The transceiver 502 may be a plurality of components. To be specific, the transceiver 502 includes a transmitter and a receiver, and provides a unit configured to communicate with various other apparatuses on a transmission medium.

The terminal provided in some embodiments of the present disclosure may perform the foregoing method embodiment. An implementation principle and a technical effect of the terminal are similar to those of the method embodiment, and details are not described again in this embodiment.

Some embodiments of the present disclosure further provides a non-transitory computer-readable storage medium, where the non-transitory computer-readable storage medium stores a computer program for performing the method for sending a MAC CE.

In conclusion, in the technical solutions provided by some embodiments of the present disclosure, UE uses a next available uplink resource for new transmission as an uplink resource used to send a MAC CE used for a BFRQ.

Optionally, for uplink resources indicated by a configured grant or uplink resources used in a random access procedure, a latest unused uplink resource is used as the uplink resource used to send the MAC CE used for the BFRQ.

For uplink resources indicated by a dynamic grant, an uplink resource indicated by a UL grant that is indicated by the latest DCI is used as the uplink resource used to send the MAC CE used for the BFRQ.

When there are a plurality of selected uplink resources, at least one of the uplink resources is determined, based on a preset priority relationship, as the uplink resource used to send the MAC CE used for the BFRQ.

According to technical solutions provided by some embodiments of the present disclosure, UE can obtain an available uplink resource as soon as possible to notify a network of beam failure, so that beam recovery can be achieved as quickly as possible, thus maintaining continuity of data transmission and improving user experience.

A person skilled in the art should understand that the embodiments of the present disclosure may be provided as methods, systems, or computer program products. Therefore, the present disclosure may use a form of hardware-only embodiments, software-only embodiments, or embodiments with a combination of software and hardware. Furthermore, the present disclosure may be in a form of a computer program product implemented on one or more computer-usable storage mediums (including but not limited to a disk memory and an optical memory) including computer-usable program code.

The present disclosure is described with reference to a flowchart and/or block diagram of a method, a device (system), and a computer program product according to some embodiments of the present disclosure. It should be understood that each process and/or block in the flowchart and/or block diagram as well as a combination of processes and/or blocks in the flowchart and/or block diagram may be implemented by computer program instructions. Those computer program instructions can be provided to a general-purpose computer, a special-purpose computer, an embedded processor, or a processor of another programmable data processing device to generate a machine, so that an apparatus configured to implement functions specified in one or more processes of a flowchart and/or one or more blocks of a block diagram is generated by using the instructions executed by the computer or the processor of the another programmable data processing device.

Those computer program instructions can also be stored in a computer readable memory that can guide a computer or another programmable data processing device to work in a specific manner, so that the instructions stored in the computer readable memory generate a product including an instruction apparatus. The instruction apparatus implements functions specified in one or more processes of a flowchart and/or one or more blocks of a block diagram.

Those computer program instructions can also be loaded into a computer or another programmable data processing device, so that a series of operation steps are executed on the computer or the another programmable device to generate processing implemented by the computer, and the instruction executed on the computer or the another programmable device provide steps of functions specified in one or more processes of a flowchart and/or one or more blocks of a block diagram.

Those of ordinary skill in the art can understand that some or all processes of the foregoing methods in the embodiments may be implemented by a computer program controlling related hardware. The foregoing program may be stored on a non-transitory computer-readable storage medium, where when the program is executed, the processes of the embodiments of the foregoing methods can be included. The foregoing storage medium may include: a magnetic disk, an optical disc, a read-only memory (ROM), a random access memory (RAM), or the like.

It may be understood that the embodiments described in some embodiments of the present disclosure may be implemented by hardware, software, firmware, middleware, microcode, or a combination thereof. For implementation with hardware, the module, unit, submodule, subunit, and the like may be implemented in one or more application specific integrated circuits (ASIC), a digital signal processor (DSP), a digital signal processing device (DSPD), a programmable logic device (PLD), a field-programmable gate array (FPGA), general processors, controllers, micro-controllers, micro-processors, and other electronic units for implementing the functions of this application, or their combinations.

For implementation with software, the technology described in some embodiments of the present disclosure may be implemented by executing functional modules (for example, a process and a function) described in some embodiments of the present disclosure. Software codes can be stored in the memory and executed by the processor. The memory may be implemented inside or outside the processor.

Therefore, the objectives of the present disclosure may also be achieved by running a program or a group of programs on any computing apparatus. The computing apparatus may be a well-known general-purpose apparatus. Therefore, the objectives of the present disclosure can also be achieved merely by providing a program product including program code for implementing the method or apparatus. In other words, such a program product also constitutes the present disclosure, and a storage medium storing such a program product also constitutes the present disclosure. Obviously, the storage medium may be any well-known storage medium or any storage medium to be developed in the future. It should be further noted that, in the apparatus and method of the present disclosure, obviously, various components or various steps may be decomposed and/or recombined. These decomposition and/or recombination should be regarded as an equivalent solution of the present disclosure. Moreover, the steps for performing the foregoing series of processing may be performed naturally in a chronological order according to a described sequence, but do not necessarily need to be performed in the chronological order, and some steps may be performed in parallel or independently.

Obviously, those skilled in the art can make various modifications and variations to the present disclosure without departing from the spirit and scope of the present disclosure. In this way, the present disclosure is intended to include these modifications and variations provided that they fall within the scope of the claims of the present disclosure and their equivalent technologies.

What is claimed is:

1. A method for sending a media access control control element, comprising:
   triggering, by user equipment (UE), generation of a media access control (MAC) control element (CE) used for a beam failure recovery request (BFRQ);
   determining a latest available uplink resource for new transmission, wherein the latest available uplink resource is a physical uplink shared channel (PUSCH) resource closest to a time for triggering generation of the MAC CE used for the BFRQ; and
   sending, on the uplink resource, a generated MAC CE used for the BFRQ.

2. The method according to claim 1, wherein the UE can complete generation of the MAC CE used for the BFRQ before sending, by using the uplink resource, the MAC CE used for the BFRQ.

3. The method according to claim 1, wherein generation of the MAC CE used for the BFRQ is triggered under any one of following conditions:
   the UE determines that a beam failure event occurs in at least one cell; or
   the UE determines that a beam failure event occurs in at least one bandwidth part (BWP); or
   the UE determines that a beam failure event occurs at at least one transmission and reception point (TRP); or
   the UE determines that a beam failure event occurs in at least one cell and a new beam is identified; or
   the UE determines that a beam failure event occurs in at least one BWP and a new beam is identified; or
   the UE determines that a beam failure event occurs at at least one TRP and a new beam is identified.

4. The method according to claim 1, wherein the uplink resource is an uplink resource used to send uplink information other than the MAC CE used for the BFRQ.

5. The method according to claim 4, wherein the uplink resource used to send uplink information other than the MAC CE used for the BFRQ is an uplink resource determined in one or a combination of following manners:
   an uplink resource indicated by a configured grant;
   an uplink resource used in a random access procedure; and
   an uplink resource indicated by an uplink grant (UL grant) that is indicated by downlink control information (DCI).

6. The method according to claim 1, wherein before the sending, on the uplink resource, a generated MAC CE used for the BFRQ, the method further comprises:
   triggering, under any one of following condition, the UE to send a scheduling request (SR) to a network side device:
   generation of the MAC CE used for the BFRQ has been triggered; or
   generation of the MAC CE used for the BFRQ has been completed; or
   the UE determines that a beam failure event occurs in at least one cell; or
   the UE determines that a beam failure event occurs in at least one bandwidth part (BWP); or
   the UE determines that a beam failure event occurs at at least one reception point (TRP); or
   the UE determines that a beam failure event occurs in at least one cell and a new beam is identified; or
   the UE determines that a beam failure event occurs in at least one BWP and a new beam is identified; or
   the UE determines that a beam failure event occurs at at least one TRP and a new beam is identified.

7. The method according to claim 3, wherein the TRP is represented by one or a combination of following:
   a control resource set or a control resource set group;
   an explicitly defined TRP;
   a transmission configuration indication state, a transmission configuration indication state list, or a transmission configuration indication state pool;
   quasi co-location (QCL) information or QCL group information;
   spatial relation information or spatial relation group information;
   a physical downlink control channel (PDCCH) scrambling identifier or a PDCCH scrambling identifier group;
   a physical downlink shared channel (PDSCH) scrambling identifier or a PDSCH scrambling identifier group;
   a PDCCH configuration information element;
   a PDSCH configuration information element; and
   a reference signal resource or a reference signal resource set.

8. The method according to claim 1, wherein in a case of determining the latest available uplink resource for new transmission, if there are a plurality of available uplink resources, at least one uplink resource with a high priority is determined based on a preset priority relationship and used to send the MAC CE used for the BFRQ.

9. The method according to claim 8, wherein the preset priority relationship comprises one or a combination of following relationships:
   a priority of an uplink resource, indicated by an uplink grant (UL grant), of a primary cell (PCell) or a primary secondary cell (PSCell) is higher than that of an uplink resource, indicated by the UL grant, of a secondary cell (SCell);
   a priority of an uplink resource, indicated by a UL grant, of a SCell in which no beam failure event occurs is higher than that of an uplink resource, indicated by a UL grant, of a SCell in which a beam failure event has occurred;
   a preset priority order for any two or a combination of following uplink resources: an uplink resource configured or indicated by a network and used to send the MAC CE used for the BFRQ, an uplink resource indicated by a configured grant and used to send uplink information other than the MAC CE used for the BFRQ, an uplink resource used in a random access procedure and used to send uplink information other than the MAC CE used for the BFRQ, and an uplink resource indicated by a dynamic grant and used to send uplink information other than the MAC CE used for the BFRQ;
   an uplink resource with a larger payload size in uplink resources indicated by a UL grant has a higher priority;
   an uplink resource with a lower latency in uplink resources indicated by a UL grant has a higher priority; and
   an uplink resource with higher reliability in uplink resources indicated by a UL grant has a higher priority.

10. A terminal, comprising a memory, a processor, and a computer program stored in the memory and executable on the processor, wherein the computer program, when executed by the processor, causes the terminal to perform:
    triggering generation of a media access control (MAC) control element MAC (CE) used for a beam failure recovery request (BFRQ);
    determining a latest available uplink resource for new transmission, wherein the latest available uplink resource is a physical uplink shared channel (PUSCH) resource closest to a time for triggering generation of the MAC CE used for the BFRQ; and
    sending, on the uplink resource, a generated MAC CE used for the BFRQ.

11. The terminal according to claim 10, wherein the terminal can complete generation of the MAC CE used for the BFRQ before sending, by using the uplink resource, the MAC CE used for the BFRQ.

12. The terminal according to claim 10, wherein generation of the MAC CE used for the BFRQ triggered under any one of following conditions:
- the terminal determines that a beam failure event occurs in at least one cell; or
- the terminal determines that a beam failure event occurs in at least one bandwidth part (BWP); or
- the terminal determines that a beam failure event occurs at at least one transmission and reception point (TRP); or
- the terminal determines that a beam failure event occurs in at least one cell and a new beam is identified; or
- the terminal determines that a beam failure event occurs in at least one BWP and a new beam is identified; or
- the terminal determines that a beam failure event occurs at at least one TRP and a new beam is identified.

13. The terminal according to claim 10, wherein the uplink resource is an uplink resource used to send uplink information other than the MAC CE used for the BFRQ.

14. The terminal according to claim 13, wherein the uplink resource used to send uplink information other than the MAC CE used for the BFRQ is an uplink resource determined in one or a combination of following manners:
- an uplink resource indicated by a configured grant;
- an uplink resource used in a random access procedure; and
- an uplink resource indicated by an uplink grant (UL grant) that is indicated by downlink control information (DCI).

15. The terminal according to claim 10, wherein the computer program, when executed by the processor, causes the terminal to further perform:
- triggering, under any one of following condition, the terminal to send a scheduling request (SR) to a network side device:
- generation of the MAC CE used for the BFRQ has been triggered; or
- generation of the MAC CE used for the BFRQ has been completed; or
- the terminal determines that a beam failure event occurs in at least one cell; or
- the terminal determines that a beam failure event occurs in at least one bandwidth part (BWP); or
- the terminal determines that a beam failure event occurs at at least one reception point (TRP); or
- the terminal determines that a beam failure event occurs in at least one cell and a new beam is identified; or
- the terminal determines that a beam failure event occurs in at least one BWP and a new beam is identified; or
- the terminal determines that a beam failure event occurs at at least one TRP and a new beam is identified.

16. The terminal according to claim 12, wherein the TRP is represented by one or a combination of following:
- a control resource set or a control resource set group;
- an explicitly defined TRP;
- a transmission configuration indication state, a transmission configuration indication state list, or a transmission configuration indication state pool;
- quasi co-location (QCL) information or QCL group information;
- spatial relation information or spatial relation group information;
- a physical downlink control channel (PDCCH) scrambling identifier or a PDCCH scrambling identifier group;
- a physical downlink shared channel (PDSCH) scrambling identifier or a PDSCH scrambling identifier group;
- a PDCCH configuration information element;
- a PDSCH configuration information element; and
- a reference signal resource or a reference signal resource set.

17. The terminal according to claim 10, wherein in a case of determining the latest available uplink resource for new transmission, if there are a plurality of available uplink resources, at least one uplink resource with a high priority is determined based on a preset priority relationship and used to send the MAC CE used for the BFRQ.

18. The terminal according to claim 17, wherein the preset priority relationship comprises one or a combination of following relationships:
- a priority of an uplink resource, indicated by an uplink grant (UL grant), of a primary cell (PCell) or a primary secondary cell (PSCell) is higher than that of an uplink resource, indicated by the UL grant, of a secondary cell (SCell);
- a priority of an uplink resource, indicated by a UL grant, of a SCell in which no beam failure event occurs is higher than that of an uplink resource, indicated by a UL grant, of a SCell in which a beam failure event has occurred;
- a preset priority order for any two or a combination of following uplink resources: an uplink resource configured or indicated by a network and used to send the MAC CE used for the BFRQ, an uplink resource indicated by a configured grant and used to send uplink information other than the MAC CE used for the BFRQ, an uplink resource used in a random access procedure and used to send uplink information other than the MAC CE used for the BFRQ, and an uplink resource indicated by a dynamic grant and used to send uplink information other than the MAC CE used for the BFRQ;
- an uplink resource with a larger payload size in uplink resources indicated by a UL grant has a higher priority;
- an uplink resource with a lower latency in uplink resources indicated by a UL grant has a higher priority; and
- an uplink resource with higher reliability in uplink resources indicated by a UL grant has a higher priority.

19. A non-transitory computer-readable storage medium, wherein the non-transitory computer-readable storage medium stores a computer program, and the computer program, when executed by a processor of a terminal, causes the terminal to perform:
- triggering generation of a media access control (MAC) control element MAC (CE) used for a beam failure recovery request (BFRQ);
- determining a latest available uplink resource for new transmission, wherein the latest available uplink resource is a physical uplink shared channel (PUSCH) resource closest to a time for triggering generation of the MAC CE used for the BFRQ; and
- sending, on the uplink resource, a generated MAC CE used for the BFRQ.

20. The non-transitory computer-readable storage medium according to claim 19, wherein triggering generation of the MAC CE used for the BFRQ under any one of following conditions:
- the terminal determines that a beam failure event occurs in at least one cell; or
- the terminal determines that a beam failure event occurs in at least one bandwidth part (BWP); or the terminal determines that a beam failure event occurs at at least one transmission and reception point (TRP); or the terminal determines that a beam failure event occurs in at least one cell and a new beam is identified; or the terminal determines that a beam failure event occurs in at least one BWP and a new beam is identified; or the terminal determines that a beam failure event occurs at at least one TRP and a new beam is identified.

* * * * *